(12) United States Patent
Winter

(10) Patent No.: US 9,374,305 B2
(45) Date of Patent: Jun. 21, 2016

(54) PACKET TRANSFER SYSTEM

(71) Applicant: Dell Products L.P., Round Rock, TX (US)

(72) Inventor: Robert Lee Winter, Burnet, TX (US)

(73) Assignee: Dell Products L.P., Round Rock, TX (US)

( * ) Notice: Subject to any disclaimer, the term of this patent is extended or adjusted under 35 U.S.C. 154(b) by 81 days.

(21) Appl. No.: 14/062,215

(22) Filed: Oct. 24, 2013

(65) Prior Publication Data

US 2015/0117448 A1 Apr. 30, 2015

(51) Int. Cl.
| | |
|---|---|
| *G06F 15/16* | (2006.01) |
| *G06F 9/44* | (2006.01) |
| *G06F 15/177* | (2006.01) |
| *H04L 12/56* | (2006.01) |
| *H04L 29/00* | (2006.01) |
| *H04L 12/743* | (2013.01) |

(52) U.S. Cl.
CPC .................................. *H04L 45/7457* (2013.01)

(58) Field of Classification Search
CPC ........... G06F 9/467; G06F 9/34; G06F 17/30; G06F 13/14; G06F 13/1615; G06F 2213/0026; H04L 45/74; H04L 45/745; H04K 7/023; H04K 7/14; H04K 7/1417; H04K 7/1422
USPC ................. 370/401, 410, 420, 473, 474, 392; 709/220–228, 230, 237
See application file for complete search history.

(56) References Cited

U.S. PATENT DOCUMENTS

| | | | |
|---|---|---|---|
| 7,010,607 B1 * | 3/2006 | Bunton ..................... | H04L 1/24 709/228 |
| 7,872,987 B1 * | 1/2011 | Hatley ................ | H04L 12/2697 370/252 |
| 8,069,293 B1 * | 11/2011 | Rogan et al. .................... | 710/301 |
| 8,875,256 B2 * | 10/2014 | Hummel et al. .................. | 726/5 |
| 8,995,302 B1 * | 3/2015 | Brown et al. ................. | 370/254 |
| 2007/0097950 A1 * | 5/2007 | Boyd et al. ..................... | 370/351 |
| 2009/0006710 A1 * | 1/2009 | Daniel et al. .................. | 710/315 |
| 2009/0327781 A1 * | 12/2009 | Tripathi ........................ | 713/324 |
| 2010/0042869 A1 * | 2/2010 | Szabo ....................... | G06F 8/67 714/4.1 |
| 2011/0243154 A1 * | 10/2011 | Flynn et al. ..................... | 370/471 |
| 2012/0079139 A1 * | 3/2012 | Sonokawa et al. .............. | 710/16 |
| 2013/0346756 A1 * | 12/2013 | Cook ...................... | G06F 21/00 713/189 |
| 2014/0019661 A1 * | 1/2014 | Hormuth et al. .............. | 710/306 |
| 2014/0269754 A1 * | 9/2014 | Eguchi et al. ................. | 370/419 |
| 2015/0067229 A1 * | 3/2015 | Connor et al. ................. | 710/317 |

* cited by examiner

*Primary Examiner* — Wutchung Chu
(74) *Attorney, Agent, or Firm* — Haynes and Boone, LLP

(57) ABSTRACT

IHS packet transfer systems and methods include a chassis housing a source IHS and a destination IHS. A component interconnect system in the chassis communicatively couples the source IHS and the destination IHS and includes a routing table that includes a destination IHS IP address of the destination IHS and a subnet associated with a component interconnect system domain. The routing table also includes a destination IHS memory address in the destination IHS, and a destination IHS port identifier for a port that is connected to the destination IHS. The component interconnect system provides a routing engine that receives, from the source IHS, a data packet that includes the destination IHS IP address and, in response, uses the routing table and the destination IHS IP address to retrieve the destination IHS memory address and the destination IHS port identifier for providing the data packet to the destination IHS.

20 Claims, 6 Drawing Sheets

PACKET TRANSFER SYSTEM

BACKGROUND

The present disclosure relates generally to information handling systems (IHSs), and more particularly to a packet transfer system for IHSs.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

The Transmission Control Protocol (TCP)/Internet Protocol (IP)/Ethernet protocol stack has become the communication protocol of choice for a wide variety of IHSs. In fact, it has become so ubiquitous that is used in many applications where Ethernet may not necessarily be the optimal choice for an under-layer protocol. For example, Peripheral Component Interconnect express (PCIe) systems are commonly used to connect server IHSs together for local communications within a server rack or server chassis, and those conventional local communications are enabled by tunneling TCP/IP/Ethernet inside the PCIe transport layer. This involves a source server IHS in the server rack/chassis sending a data packet that includes TCP/IP/Ethernet information to its associated Network Interface Controller (NIC) (a "first" NIC) over PCIe, the first NIC using the Ethernet information to send the data packet out of the server rack/chassis and over a network to a router, the router using the IP information to route the data packet back to the server/rack chassis to a NIC (a "second" NIC) that associated with a destination server IHS in the server rack/chassis, and the second NIC sending the data packet over PCIe to the destination server IHS. Communicating in such a manner introduces unnecessary protocol layering and inefficiencies.

Accordingly, it would be desirable to provide an improved packet transfer system.

SUMMARY

According to one embodiment, a packet transfer system includes a chassis; a source information handling system (IHS) located in the chassis; a destination IHS located in the chassis; and a component interconnect system located in the chassis and communicatively coupling the source IHS and the destination IHS, wherein the component interconnect system includes: a routing table including a destination IHS Internet Protocol (IP) address that is associated with the destination IHS and that includes a subnet associated with a domain of the component interconnect system, a destination IHS memory address associated with a memory system in the destination IHS, and a destination IHS port identifier that is associated with a port on the component interconnect system that is connected to the destination IHS; and a routing engine that is configured to receive, from the source IHS, a data packet that includes the destination IHS IP address and, in response, use the routing table and the destination IHS IP address to retrieve the destination IHS memory address and the destination IHS port identifier, and use the destination IHS port identifier and the destination IHS memory address to provide the data packet to the destination IHS

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
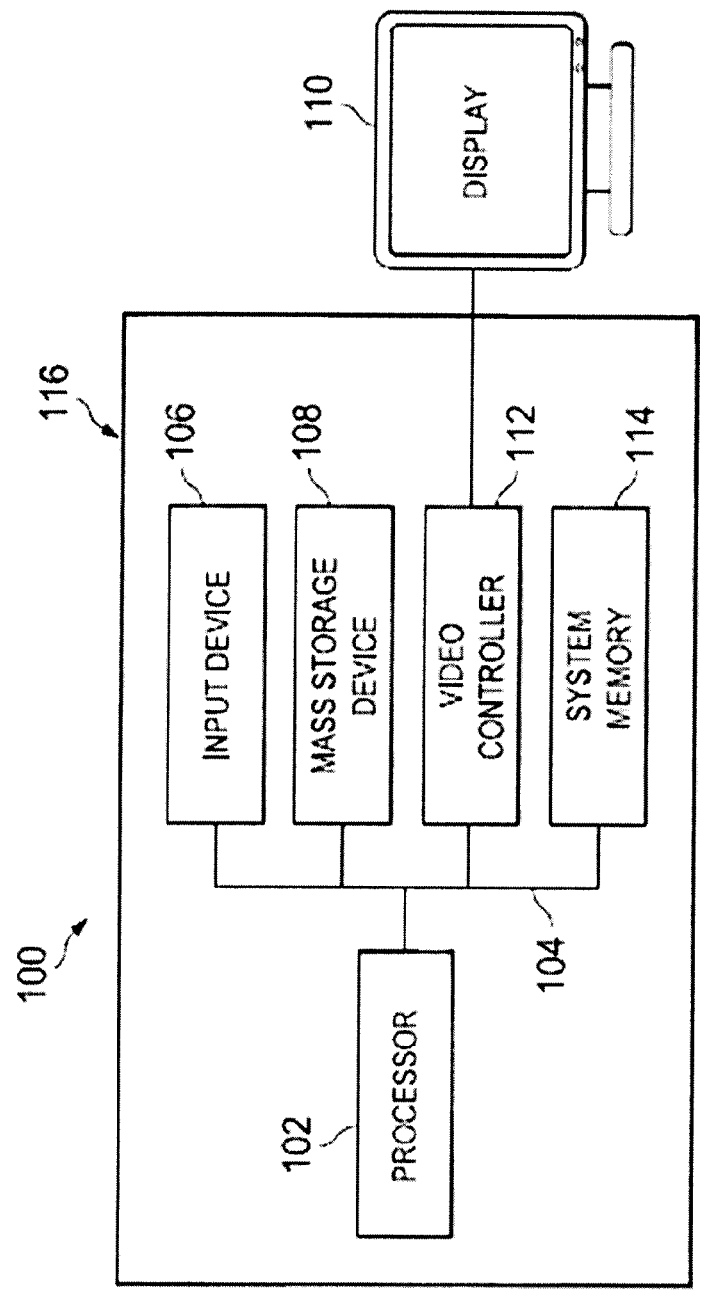
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
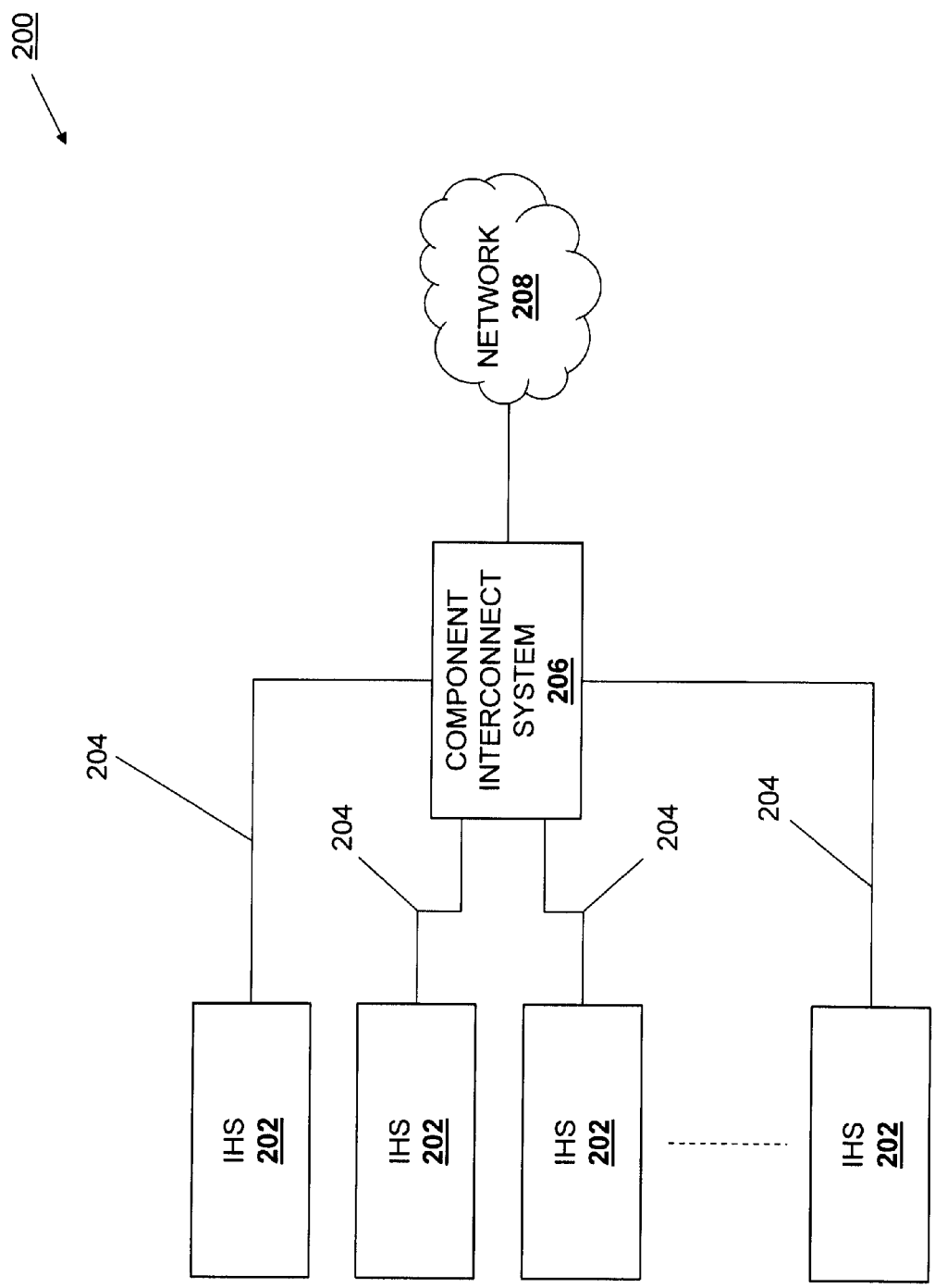
FIG. 2 is a schematic view illustrating an embodiment of a packet transfer system.

Referring now to FIG. 2, an embodiment of a packet transfer system 200 is illustrated. The packet transfer system 200 includes a plurality of IHSs 202, each of which may be the IHS 100, discussed above with reference to FIG. 1, or may include some or all of the components of the IHS 100. The plurality of IHSs 202 are locally communicatively coupled together via local connections 204 to a component interconnect system 206. In the embodiments illustrated and discussed below, the component interconnect system 206 includes a Peripheral Component Interconnect express (PCIe) system, and the local connections 204 are PCIe connections, that connect the IHSs 202 within a chassis. However, one of skill in the art in possession of the present disclosure will recognize that a wide variety of different types of local connections 204 and component interconnect systems 206 may be provided in the packet transfer system 200 described herein while remaining within the scope of the present disclosure. As illustrated, the component interconnect system 206 may be coupled to a network 208 to, for example, provide for the communication of the IHSs 202 with IHSs that are connected to the network 208. However, contrary to the conventional local packet transfer systems discussed above, that network 208 is not used for the local communications between the IHSs 202.

Figure 3:
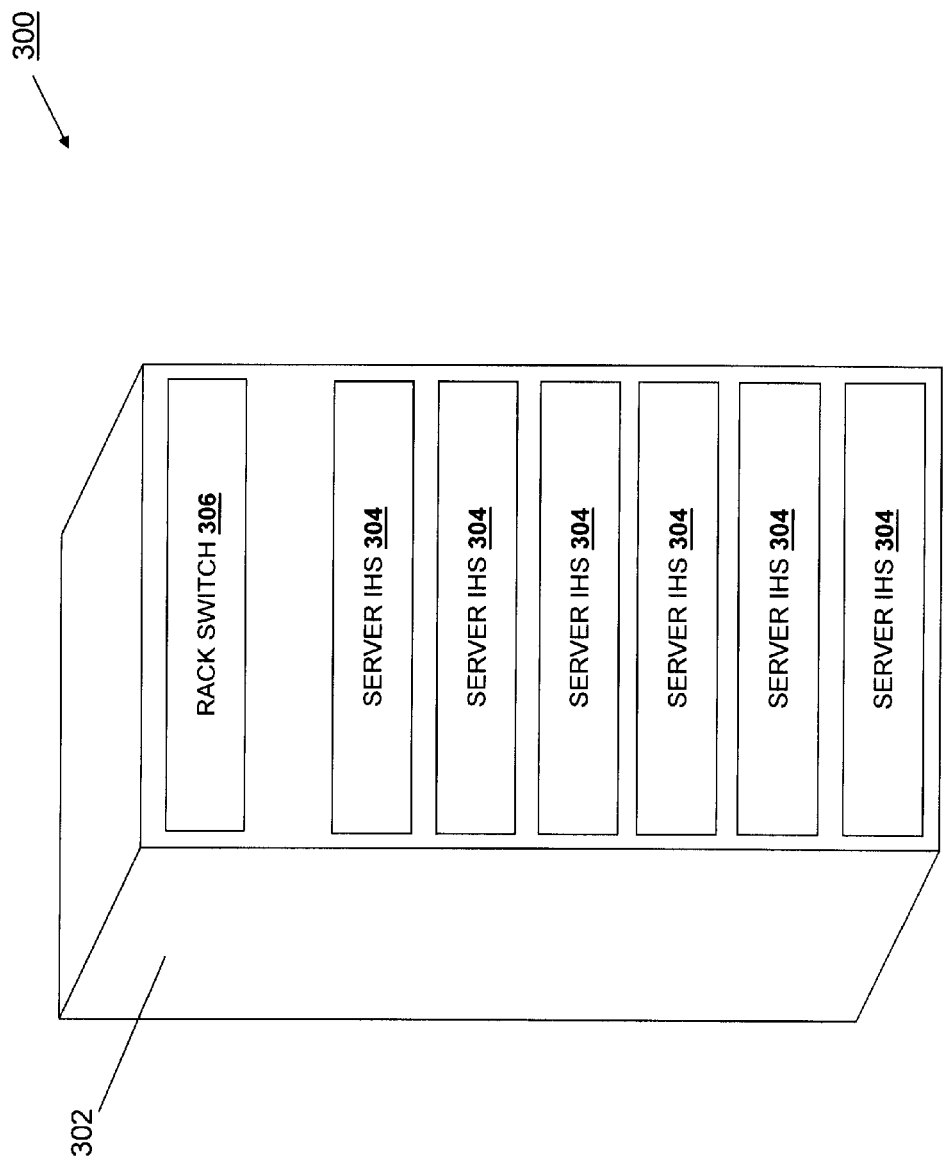
FIG. 3 is a perspective view illustrating an embodiment of a packet transfer system.

Referring now to FIG. 3, a specific embodiment of a packet transfer system 300 is illustrated that may be the packet transfer system 200, discussed above with reference to FIG. 2. The packet transfer system 300 includes an IHS chassis 302 which, in the illustrated embodiment, is a server chassis, server rack, and/or a variety of other IHS chassis known in the art. However, any chassis known in the art that houses a plurality of IHSs may benefit from the teachings of the present disclosure. A plurality of server IHSs 304, which may be the plurality of IHSs 202 discussed above with reference to FIG. 2, are located in the chassis 302 and communicatively coupled together by a plurality of local connections (not illustrated, but which may be the same as the local connections 204 discussed above with reference to FIG. 2) to a rack switch 306, which may be the component interconnect system 206 discussed above with reference to FIG. 2. Thus, in the specific embodiment illustrated in FIG. 3, a plurality of server IHSs 304 are communicatively coupled together in a server rack or chassis via PCIe connections to a rack switch 306 that, as discussed in further detail below, provides for the local communication between the server IHSs 304 free of a layer-2 (data link layer) network and without the need for a layer-2/data link layer protocol such as Ethernet.

Figure 4:
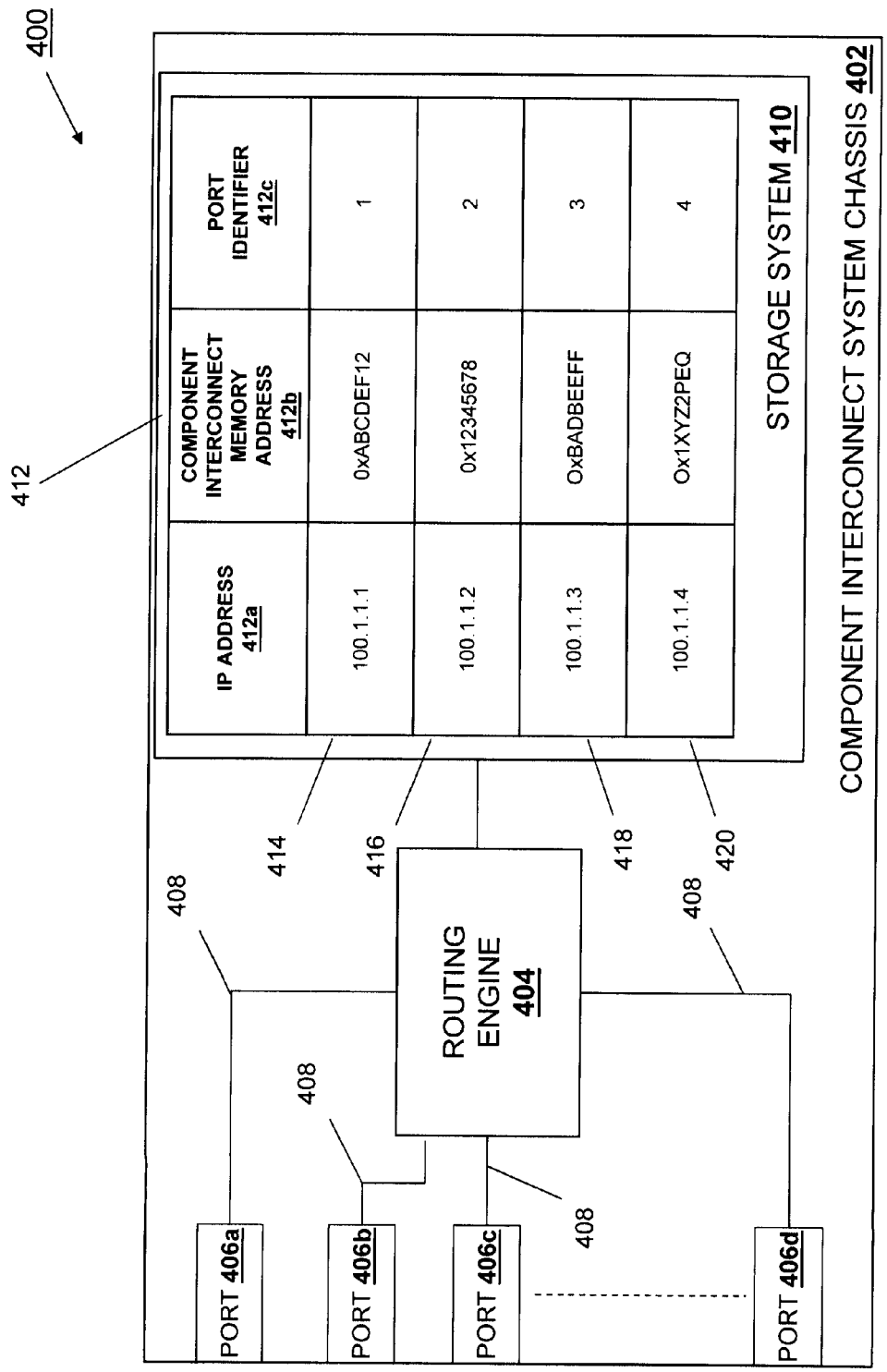
FIG. 4 is a schematic view illustrating an embodiment of a component interconnect system in the packet transfer system of FIG. 2 or 3.

Referring now to FIG. 4, an embodiment of a component interconnect system 400 is illustrated that may be the component interconnect system 206 discussed above with reference to FIG. 2, the rack switch 306 discussed above with reference to FIG. 3, and/or other component interconnect systems that one of skill in the art in possession of the present disclosure would recognize would benefit from the teachings of the present disclosure. In the illustrated embodiment, the component interconnect system 400 includes a component interconnect system chassis 402, which may be the chassis of the rack switch 306 illustrated in FIG. 3. However, in other embodiments, the features of the interconnect system 400 may distributed throughout a chassis (e.g., the chassis 302) that houses the IHSs 202/server IHSs 304. In an embodiment, the component interconnect system 400 includes at least one processor (e.g. the processor 102 of FIG. 1) and a non-transitory memory (e.g., the storage device 108 and/or the system memory 114 of FIG. 1) that includes instruction that, when executed by the at least one processor, cause the at least one processor to provide a routing engine 404 that is configured to perform the functions of the routing engines and/or component interconnect systems discussed herein. The routing engine 404 is coupled to a plurality of ports 406a, 406b, 406c, and up to 406d (e.g., through the coupling of the at least one processor and the ports 406a-d via connections 408, which may be, for example, PCIe connections) that may each be coupled to a respective IHS 202/server IHS 304. The routing engine 404 is also coupled to a storage system 410 (e.g., the storage device 108 and/or the system memory 114 of FIG. 1.)

The storage system 410 stores a routing table 412 that includes columns for an Internet Protocol (IP) address 412a for each of the plurality of IHSs 202/server IHSs 304 connected to the ports 406a-d, a component interconnect memory address 412b (e.g., a PCIe memory address for PCIe addressable write buffer(s)) for each of the plurality of IHSs 202/server IHSs 304 connected to the ports 406a-d, and a port identifier 412c that identifies the ports 406a-d connected to each of the plurality of IHSs 202/server IHSs 304. As can be seen in the illustrated embodiment, a first row 414 of the routing table 412 provides a port identifier 412c (e.g., "1") identifying the port 406a connected to an IHS 202/server IHS 304 that includes an IP address 412a (e.g., "100.1.1.1") and a PCIe memory address 412b (e.g., "0xABCDEF12") in a memory system of the IHS 202/server IHS 304. Similarly, a second row 416 of the routing table 412 provides a port identifier 412c (e.g., "2") identifying the port 406b connected to an IHS 202/server IHS 304 that includes an IP address 412a (e.g., "100.1.1.2") and a PCIe memory address 412b (e.g., "0x12345678") in a memory system of the IHS 202/server IHS 304, a third row 418 of the routing table 412 provides a port identifier 412c (e.g., "3") identifying the port 406c connected to an IHS 202/server IHS 304 that includes an IP address 412a (e.g., "100.1.1.3") and a PCIe memory address 412b (e.g., "0xBADBEEFF") in a memory system of the IHS 202/server IHS 304, and a fourth row 420 of the routing table 412 provides a port identifier 412c (e.g., "4") identifying the port 406d connected to an IHS 202/server IHS 304 that includes an IP address 412a (e.g., "100.1.1.4") and a PCIe memory address 412b (e.g., "0x1XYZ2PEQ") in a memory system of the IHS 202/server IHS 304.

In an embodiment, each of the IP addresses 412a includes a subnet (e.g., "100") that is associated with a domain of the component interconnect system 400 such that data packets having that subnet are recognized by the routing engine 404, discussed in further detail below. One of skill in the art in possession of the present disclosure will recognize that a domain may be provided for the component interconnect system 400 and identified in the IP address subnet for the IHSs 202/server IHSs 304 that are coupled to the ports 406a-d such that local data packets exchanged between the IHSs 202/server IHSs 304 may be distinguished from data packets destined for IHSs connected to the network 208.

Figure 5:
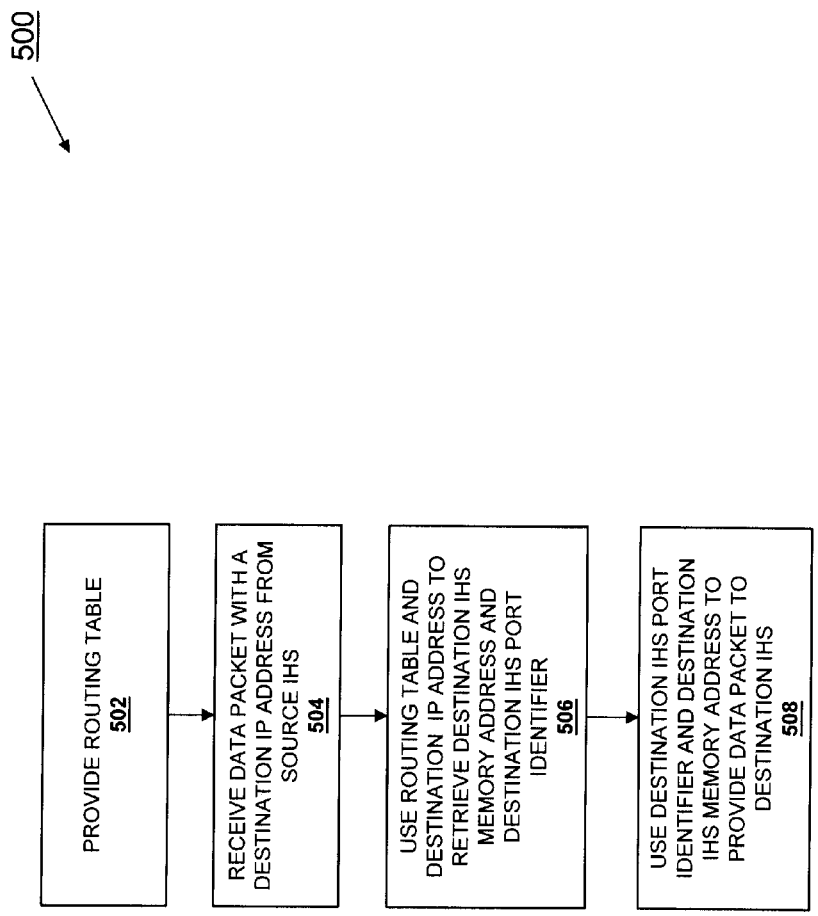
FIG. 5 is a flow chart illustrating an embodiment of a method for transferring packets.

Referring now to FIG. 5, an embodiment of a method 500 for transferring packets is illustrated. As discussed above, the TCP/IP/Ethernet protocol stack has become the communication protocol of choice for a wide variety of IHSs. Historically, Ethernet has been a loss-prone medium, but has become more reliable in recent years due to improvements such as PAUSE framing (e.g., on a link basis as describes in the Institute of Electrical and Electronics Engineers (IEEE) 802.3x standards, on a sub-link basis as used in Data Center Bridging (DCB) or described in the IEEE 802.1Qbb standards, etc.) However, TCP/IP provides guaranteed delivery regardless of which physical and data link layers it operates above, and therefore can operate in environments where Ethernet may not necessarily be the best choice for an underlayer protocol. One example of such a situation is when Peripheral Component Interconnect express (PCIe) is used for server IHS to server IHS local communication within a server chassis or server rack. Conventional methods to provide such local communication involve tunneling TCP/IP and Ethernet inside the PCIe transport layer, discussed above, which introduces unnecessary protocol layering and inefficiency, as the local data exchanges between the server IHSs are simply traversing a path between local TCP socket/port endpoints where traditional IP routing and Ethernet switching is not required. In such conventional local communication methods, the endpoints of the communication are identified in the data packet by their IP addresses and TCP port numbers, and an Ethernet Media Access Control (MAC) address is included in the data packet to traverse the layer-2 network. It has been discovered that, when local communications are conducted between IHSs connected via a PCIe system and without the need to traverse a layer-2 network, PCIe is the only protocol required. PCIe, unlike Ethernet, is a truly lossless fabric using buffer credit flow control as opposed to the relatively less reliable PAUSE mechanism provided in Ethernet. The method 500 provides for the local communication between IHSs 202/server IHSs 304 without the use of Ethernet protocol/layer-2 networks that are used in conventional local communications, instead utilizing TCP/IP with PCIe directly as physical and data link layers to achieve local communications that are faster, simpler, and more efficient. While the embodiments discussed below utilize TCP/IP communications due to TCP/IP representing a convention that a majority of applications are designed to, future embodiments may substitute other communications protocols while remaining within the scope of the present disclosure.

The method 500 begins at block 502 where a routing table is provided. At block 502, the information in the columns of the routing table 412 for the IP address 412a, the component interconnect memory address 412b, and the port identifier 412c for each IHS 202/server IHS 304 connected to the ports 406a-d is provided. In some embodiments of block 502, the information in the routing table 412 may be configured by an administrator of the packet transfer system 200/300 by, for example, manually determining the IP addresses 412a, component interconnect memory addresses 412b, and port identifiers 412c for each of the IHSs 202/server IHSs 304 connected to the ports 406a-d and entering that information into the routing table 412. In other embodiments of block 502, the routing engine 404 may operate to automatically retrieve the IP addresses 412a, component interconnect memory addresses 412b, and port identifiers 412c for each of the IHSs 202/server IHSs 304 connected to the ports 406a-d (e.g., upon that IHS 202/server IHS 304 being connected to a port 406a-d and powered on), and then provide that information in the routing table 412.

Figure 6:
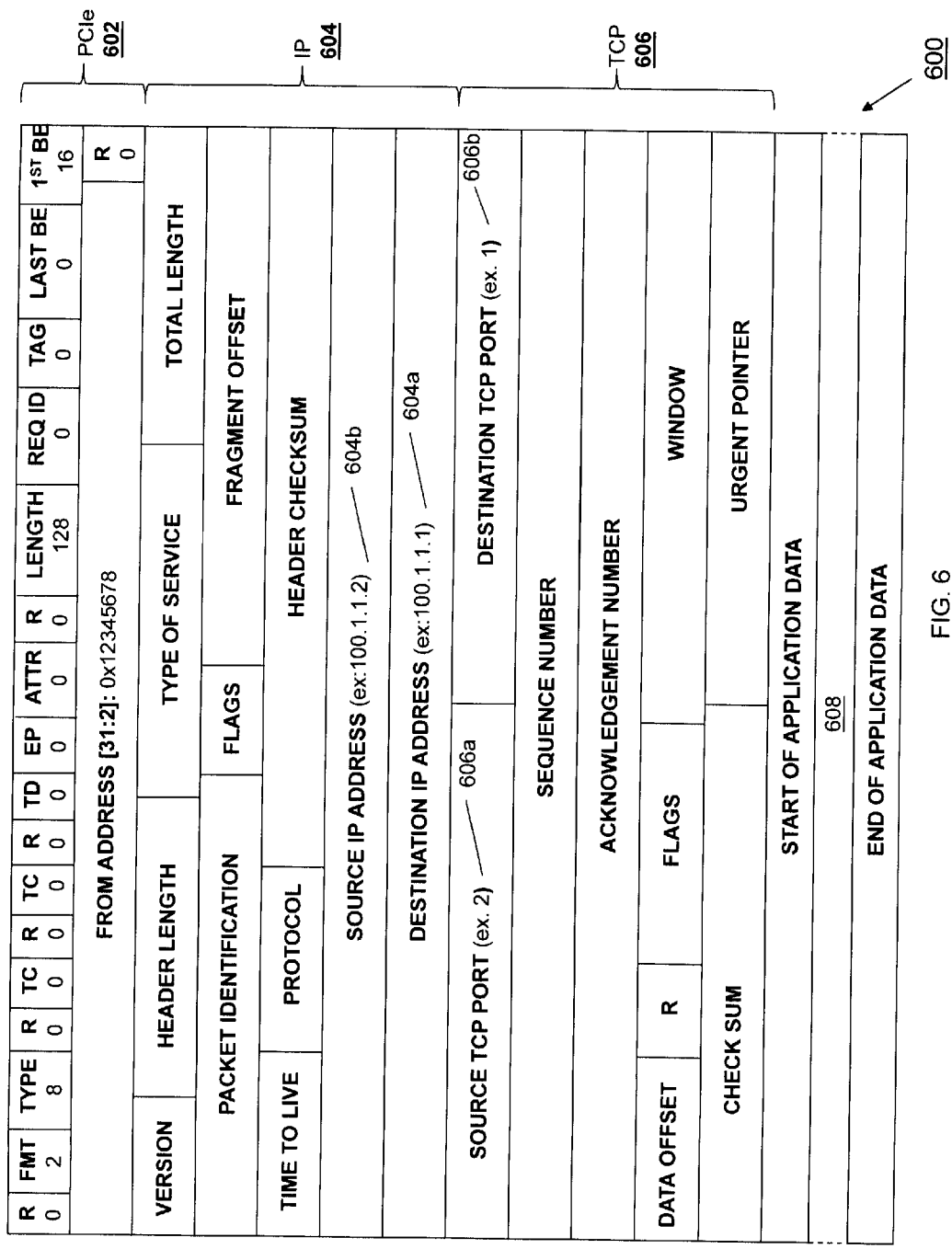
FIG. 6 is an schematic view illustrating an embodiment of a data packet.

Referring now to FIGS. 5 and 6, the method 500 then proceeds to block 504 where a data packet that includes a destination IHS IP address is received from a source IHS. For the purposes of the embodiment described below, at block 504 the routing engine 404 receives a data packet from a first IHS (referred to henceforth as the "source IHS") that is connected to the port 406b, and at block 508 provides that data packet to a second IHS (referred to henceforth as the "destination IHS") that is connected to the port 406a. However, the data packet may be received from and provided to IHSs connected to any of the ports 406a-d on the component interconnect system 400. FIG. 6 illustrates an embodiment of a data packet 600 that may be received by the routing engine 404 at block 504. In the illustrated embodiment, the data packet 600 includes a component interconnect (e.g., PCIe in the illustrated embodiment) section 602, an IP section 604, and a TCP section 606. For example, the PCIe section 602 includes information that allows the routing engine 404 to route the data packet 600 over a transaction layer, a data link layer, and a physical layer in the PCIe system 206/400 that connects the source IHS and destination IHS. The IP section 604 includes information such as a destination IHS IP address 604a with a subnet (e.g. "100") that is associated with a domain of the component interconnect system 400. The IP section 604 also includes other information such as, for example, a source IHS IP address 604b that may be used to confirm that the source IHS sending the data packet 600 is within the proper subnet (e.g., in the domain of the component interconnect system 400). The TCP section 606 includes information such as TCP source port information 606a and TCP destination port information 606b that identifies the applications at either end of a TCP connected socket/port, and that may be used per conventional operations of TCP. The data packet 600 also includes application data 608 that is being communicated from the source IHS to the destination IHS. The data packet 600 provides an example of how TCP/IP data may be directly provided in the PCIe transaction layer protocol (TLP) and data link protocol (DLP) to provide TLP/DLP information that may be used to locally route the data packet over PCIe such that Ethernet/layer-2 information is not included in the data packet 600 and thus the Ethernet protocol and/or a layer-2 network is not used to route the data packet 600 between the source IHS and the destination IHS. While a specific embodiment of the data packet 600 has been illustrated and described, modifications to the data packet 600 that still allow for the provision of the data packet from the source IHS to the destination IHS as taught herein are envisioned as falling within the scope of the present disclosure. Furthermore, while a few pieces of the information provided in the data packet 600 have been described above, one of skill in the art will recognize the variety of users available for the other information in the data packet 600 illustrated in FIG. 6.

The method 500 then proceeds to block 506 where the routing table and the destination IP address are used to retrieve a destination IHS memory address and a destination IHS port identifier. In an embodiment, at block 506, the routing engine 404 retrieves the destination IHS IP address 604a (e.g., "100.1.1.1") in the data packet 600 and determines that the subnet (e.g., "100") in the destination IHS IP address 604a is associated with the domain of the component interconnect system 400, which as discussed above allows the routing engine 404 to recognize that the data packet 600 has been provided for a local communication between the IHSs 202/server IHSs 304 within a chassis (e.g., the server chassis 302). In response to recognizing that the subnet in the destination IHS IP address 604a is a domain of the component interconnect system 400, the routing engine 404 then uses the destination IHS IP address 604a as a reference into the routing table 412. In the illustrated embodiment, the use of the destination IHS IP address 604a as a reference into the routing table 412 provides the routing engine 404 a reference to the first row 414 of the routing table 412 (e.g., based on the IP address 412a in that row being "100.1.1.1", the same as the destination address 604a in the data packet 600 received at block 506.) That use of the destination IHS IP address 604a as a reference into the routing table 412 also allows the routing engine 404 to retrieve the component interconnect memory address 412b in the first row 414 (e.g., "0xABCDEF12", which corresponds to a location within a memory system of the destination IHS) and the destination IHS port identifier 412c in the first row 414 (e.g., "1", which corresponds to the port 406a to which the destination IHS is connected).

The method 500 then proceeds to block 508 where the destination IHS port identifier and the destination IHS memory address are used to provide the data packet to the destination IHS. In an embodiment, the routing engine 404 uses the destination IHS port identifier 412c in the first row 414 of the routing table 412 to send the data packet 600 through the port 406a (e.g., port "1" in the routing table 412) to the component interconnect memory address 412b (e.g., "0xABCDEF12" in the routing table 412) in the memory system of the destination IHS. Thus, the component interconnect system 400 and routing engine 404 are configured to use the information in the data packet 600, which does not include Ethernet protocol information and/or layer-2 network information, to locally route the data packet 600 over the local connections (e.g., PCIe connections) free of a layer-2 network, providing local communication between IHSs that is faster, simpler, and more efficient relative to the conventional TCP/IP and Ethernet tunneling methods currently used. While a destination IHS IP address 604a is included in the data packet 600, that IP address is not used for conventional "routed" IP communications that use routers and routing protocols such as Open Shortest Path First (OSPF), Border Gateway Protocol (BGP), Routing Information Protocol (RIP), and/or a variety of other routed IP communications techniques known in the art. Rather, the destination IP address provides for "steered" IP communications in which the IP address is provided as a tag with special subnet that results in a routing table lookup to provide for local communications exclusively over the local component interconnect system such as the PCIe system described herein. The steered IP communications of the present disclosure provide for the removal of Ethernet and the use of a physical and data link protocol set, e.g., PCIe, that is better suited for communications in a local environment.

In an embodiment, a PCIe socket mechanism may be used to create a class of sockets/ports 406a-d (e.g., SOCK_PCIE) that utilize the PCIe infrastructure to exchange data in the packet transfer system described herein via, for example, posted PCIe writes without the requirement of a completion TLP packet. For example, when an IHS or application on an IHS opens a socket of type SOCK_PCIE, it may be determined that that a proper IP address for type SOCK_PCIE is being used (e.g., an IP address with a PCIe associated IP subnet). According to the steered IP communications discussed above, PCIe addressable write buffers may then be allocated and reserved on both sides of the connection for the session duration. The TCP/IP communication may then proceed with TCP/IP packets encapsulated within the PCIe TLP/DLP packets as discussed above, and the TCP protocol may proceed by exchanging writes between the two endpoints (e.g., the source IHS and the destination IHS) that each write TCP information within respective PCIe write buffers. An IHS or application on the IHS using SOCK_PCIE sockets or ports will not be aware of any difference in the operation of TCP/IP, as posted PCIe writes are used with no requirement for a completion TLP packet, and the normal operation of the TCP protocol may be depended on to achieve guaranteed delivery if a PCIe write error occurs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A packet transfer system, comprising:
a chassis;
a source information handling system (IHS) located in the chassis;
a destination IHS located in the chassis; and
a component interconnect system located in the chassis and providing a memory domain fabric that communicatively couples the source IHS and the destination IHS, wherein the component interconnect system includes:
a routing table including a destination IHS Internet Protocol (IP) address that is associated with the destination IHS and that includes a subnet associated with a domain of the component interconnect system, a destination IHS memory address associated with a memory system in the destination IHS, and a destination IHS port identifier that is associated with a port on the component interconnect system that is connected to the destination IHS; and
a routing engine that is configured to receive, from the source IHS through the memory domain fabric and free of a layer-2 network, a memory domain data packet that encapsulates Transmission Control Protocol/Internet Protocol (TCP/IP) information that includes the destination IHS IP address and, in response, retrieve the destination IP address from the memory domain data packet and use the destination IP address with the routing table to retrieve the destination IHS memory address and the destination IHS port identifier, and use the destination IHS port identifier and the destination IHS memory address to provide the memory domain data packet to the destination IHS through the memory domain fabric and free of a layer-2 network.

2. The packet transfer system of claim 1, wherein the component interconnect system includes a Peripheral Component Interconnect express (PCIe) system that provides local PCIe connections between the source IHS and the destination IHS.

3. The packet transfer system of claim 1, wherein the routing engine is configured to automatically retrieve and store each of the destination IHS IP address, the destination IHS memory address, and the destination IHS port identifier in the routing table.

4. The packet transfer system of claim 1, wherein the memory domain data packet includes transaction layer protocol (TLP) information and data link protocol (DLP) information, and wherein the routing engine is configured to use the TLP information and DLP information to provide the memory domain data packet to the destination IHS.

5. The packet transfer system of claim 1, wherein the memory domain data packet includes Peripheral Component Interconnect express (PCIe) information.

6. The packet transfer system of claim 1, wherein the memory domain data packet is free of layer-2 network information.

7. The packet transfer system of claim 1, wherein each of the source IHS and the destination IHS are server IHSs.

8. An information handling system (IHS), comprising:
a first port that is configured to couple to a first IHS;
a second port that is configured to couple to a second IHS;
at least one processor coupled to each of the first port and the second port; and a non-transitory memory storing a routing table that includes a first IHS Internet Protocol (IP) address that is associated with the first IHS and that includes a subnet associated with a domain a local interconnect system that includes the first port and the second port, a first IHS memory address associated with a memory system in the first IHS, and a first IHS port identifier that is associated with the first port in the local interconnect system, and wherein the non-transitory memory includes instruction that, when executed by the at least one processor, cause the at least one processor to provide a routing engine that is configured to:
  receive, from the second IHS coupled to the second port through a memory domain fabric and free of a layer-2 network, a memory domain data packet that encapsulates Transmission Control Protocol/Internet Protocol (TCP/IP) information that includes the first IHS IP address;
  retrieve the destination IP address from the memory domain data packet and use the first IHS IP address with the routing table to retrieve the first IHS memory address and the first IHS port identifier; and
  use the first IHS port identifier and the first IHS memory address to provide the memory domain data packet to the first IHS that is coupled to the first port though the memory domain fabric and free of a layer-2 network.

9. The IHS of claim 8, wherein the local interconnect system further comprises:
  Peripheral Component Interconnect express (PCIe) circuitry that provides local PCIe connections between the first IHS and the second IHS.

10. The IHS of claim 8, wherein the routing engine is configured to automatically retrieve and store each of the first IHS IP address, the first IHS memory address, and the first IHS port identifier in the routing table.

11. The IHS of claim 8, wherein the memory domain data packet includes transaction layer protocol (TLP) information and data link protocol (DLP) information, and wherein the routing engine is configured to use the TLP information and DLP information to provide the memory domain data packet to the first IHS.

12. The IHS of claim 8, wherein the memory domain data packet includes Peripheral Component Interconnect express (PCIe) information.

13. The IHS of claim 8, wherein the memory domain data packet is free of layer-2 network information.

14. The IHS of claim 8, wherein each of the first IHS and the second IHS are server IHSs that are located in a server chassis.

15. A method for transferring packets, comprising:
providing a routing table including:
  a destination IHS Internet Protocol (IP) address that is associated with a destination IHS that is located in a chassis, wherein the destination IHS IP address includes a subnet associated with a domain of a local interconnect system;
  a destination IHS memory address associated with a memory system in the destination IHS; and
  a destination IHS port identifier that is associated with a port on the local interconnect system that is connected to the destination IHS;
receiving, from a source IHS that is located in the chassis through a memory domain fabric and free of a layer-2 network, a memory domain data packet that encapsulates Transmission Control Protocol/Internet Protocol (TCP/IP) information that includes the destination IHS IP address;
retrieving the destination IP address from the memory domain data packet and using the destination IP address with the routing table to retrieve the destination IHS memory address and the destination IHS port identifier; and
using the destination IHS port identifier and the destination IHS memory address to provide the memory domain data packet to the destination IHS through the memory domain fabric and free of a layer-2 network.

16. The method of claim 15, wherein the local interconnect system includes a Peripheral Component Interconnect express (PCIe) system that provides local PCIe connections between the source IHS and the destination IHS.

17. The method of claim 15, further comprising:
automatically retrieving and storing each of the destination IHS IP address, the destination IHS memory address, and the destination IHS port identifier in the routing table.

18. The method of claim 15, wherein the memory domain data packet includes transaction layer protocol (TLP) information and data link protocol (DLP) information, and wherein the method further comprises:
using the TLP information and DLP information to provide the memory domain data packet to the destination IHS.

19. The method of claim 15, wherein the memory domain data packet includes Peripheral Component Interconnect express (PCIe) information.

20. The method of claim 15, wherein the memory domain data packet is free of layer-2 network information.

* * * * *